(12) United States Patent
Zhou et al.

(10) Patent No.: US 9,411,414 B2
(45) Date of Patent: Aug. 9, 2016

(54) METHOD AND SYSTEM FOR PROVIDING IMMERSIVE EFFECTS

(75) Inventors: Xiaoming Zhou, Eindhoven (NL); Andrew A. Tokmakoff, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 451 days.

(21) Appl. No.: 13/131,607

(22) PCT Filed: Nov. 18, 2009

(86) PCT No.: PCT/IB2009/055133
§ 371 (c)(1),
(2), (4) Date: May 27, 2011

(87) PCT Pub. No.: WO2010/067221
PCT Pub. Date: Jun. 17, 2010

(65) Prior Publication Data
US 2011/0227824 A1 Sep. 22, 2011

(30) Foreign Application Priority Data

Dec. 9, 2008 (EP) .................................... 08171041

(51) Int. Cl.
*G06F 3/033* (2013.01)
*G06F 3/01* (2006.01)

(52) U.S. Cl.
CPC ...................................... *G06F 3/013* (2013.01)

(58) Field of Classification Search
CPC . G06F 3/04842; G06F 3/04815; G06F 3/011; G06Q 30/0251; G06Q 30/0643; G06T 19/006
See application file for complete search history.

(56) References Cited

U.S. PATENT DOCUMENTS

| 5,382,970 A * | 1/1995 | Kiefl ...................... H04H 60/40 348/E7.072 |
| 7,921,036 B1 * | 4/2011 | Sharma et al. ............. 705/14.66 |
| 2004/0119662 A1 * | 6/2004 | Dempski ............... G01S 3/7864 345/8 |
| 2005/0285844 A1 * | 12/2005 | Morita ................... A61B 6/466 345/156 |

(Continued)

FOREIGN PATENT DOCUMENTS

| JP | 11-327425 | 11/1999 |
| JP | 2005006897 A | 1/2005 |

(Continued)

OTHER PUBLICATIONS

K. Smith et al, "Tracking the Visual Focus of Attention for a Varying Number of Wandering People", IEEE Transactions on Pattern Analysis and Machine Intelligence, vol. 30, No. 7, Jul. 1, 2008.

(Continued)

*Primary Examiner* — Lixi C Simpson
*Assistant Examiner* — Ngan T Pham Lu

(57) ABSTRACT

A method of providing immersive effects includes receiving data representative of at least one image. The image data is analyzed to locate at least one object identified within the image. A visual focus of attention of at least one subject able to observe the at least one image is estimated. At least one signal is provided in dependence on at least a position of the visual focus of attention relative to the location of the at least one object in the 5 at least one image to a system (16-19; 31-34) for providing an immersive effect to the at least one subject.

25 Claims, 3 Drawing Sheets

(56) References Cited

U.S. PATENT DOCUMENTS

2008/0077321 A1    3/2008    Widodo et al.
2009/0177528 A1*  7/2009    Wu ........................ G06Q 30/02
                                                              705/14.44

FOREIGN PATENT DOCUMENTS

| JP | 2006155238 A | | 6/2006 |
| --- | --- | --- | --- |
| JP | 20070796620 A | | 3/2007 |
| JP | 2008082822 A | | 4/2008 |
| NL | WO 2006/100645 | * | 9/2006 |
| WO | 2006100645 A2 | | 9/2006 |

OTHER PUBLICATIONS

S. Meers et al, "Haptic Gaze-Tracking Based Perception of Graphical User Interfaces", Faculty of Informatics—Paper, University of Wollongong, 2007.

J. Sanders, "One Size Doesn't Fit All: New Software Would Customize Graphics-Based Computer Interaction for People With Low Vision", Research Horizons Magazine, Dec. 2, 2004, Created Sep. 22, 2008.

* cited by examiner

METHOD AND SYSTEM FOR PROVIDING IMMERSIVE EFFECTS

FIELD OF THE INVENTION

The invention relates to a method of providing immersive effects, a system for controlling provision of immersive effects, and a computer programme.

BACKGROUND OF THE INVENTION

WO 2006/100645 discloses a system that generates an immersive reading experience for literary material currently being viewed by a user. The system comprises at least one camera that captures images of the user viewing the material and at least one processor operatively coupled to the camera that receives the images from the camera. The processor is configured to process the images and use the images to determine the location in the material currently being viewed by the user. It is further configured to process the location in the material to generate at least one immersive effect related output corresponding to the current material being viewed by the user. In one embodiment, the system includes an e-book. A memory of the e-book stores an electronic version of the text of a work that a processor of the e-book uses to display. In that case, effect-related data is preferably included in a software layer or sub-code of the electronic version of the text that is not visible to the user. The processor uses the location currently being viewed to identify the text it is currently displaying at that location of display. The processor uses the memory location of the text being displayed to retrieve the corresponding immersive effect data. In an alternative embodiment using a paper book, the immersive effects data will preferably be referenced in memory according to the page, and positioned on the page of the paper book where the corresponding text appears. A camera may be used to capture images of the page itself, and image processing may be used to recognize the page number the book is opened to.

The known method uses structured data for generating an image in order to relate a gaze point to an immersive effect, with the rendering device, e.g. the e-book, keeping track of where it has placed text.

SUMMARY OF THE INVENTION

It is desirable to provide a method, system and computer programme of the types defined in the opening paragraphs that are suitable for use with a wider range of images, including in particular also a sequence of moving (dynamic) images.

This object is achieved by the method according to the invention, which includes:
receiving data representative of at least one image;
analyzing the image data to locate at least one object identified within the image;
estimating a visual focus of attention of at least one subject able to observe the at least one image; and
providing at least one signal in dependence on at least a position of the visual focus of attention relative to the location of the at least one object in the at least one image to a system for providing an immersive effect to the at least one subject.

Receiving data representative of at least one image and analyzing the image data to locate at least one object identified within the image allows the method to function without the provision of an implicit or explicit mapping of image position to effect for the or each image. In the case of a sequence of images, this means that the system running the method need not be provided with a synchronized data stream containing such a mapping. For the same reason, the method can also function with a larger range of images, e.g. any image in hard copy of which a digital representation is analyzed. In such embodiments, structured data including a mapping of image position to immersive effect is not required, so long as objects can be recognized and related to immersive effects.

It is observed that in the context of the present disclosure, the term subject is used to denote a living subject, i.e. a human or an animal, such as a household pet or the like.

An embodiment of the method includes estimating a respective visual focus of attention of each of a number of subjects able to observe the at least one image, and adapting the at least one signal to the system for providing an immersive effect in dependence on the foci of attention of the subjects.

This embodiment allows the same immersive effect to be provided to all subjects when they are all focusing on essentially the same object (within or outside the image). If not, then a weakened immersive effect can be provided or no feedback at all. Alternatively, this embodiment provides the potential for generating differentiated feedback.

A variant, wherein the system is configured to provide separate immersive effects at each of a number of output locations, further includes determining the locations of the subjects, at least in relation to the output locations.

This variant enables appropriate immersive effects to be provided as feedback to multiple subjects, even when they are looking at different things.

In an embodiment, the at least one signal is provided to a system for providing an immersive effect including at least one device for providing haptic feedback.

Haptic feedback, involving the conveying of forces, vibration and/or motion to a subject, can only be conveyed over short distances, essentially only through direct contact. An effect is that immersive effects provided as feedback to one subject are unlikely to be perceived by others. Thus, in a situation where a number of subjects are able to observe the image but only one of them is looking at a particular object within the image, feedback associated with that object can be targeted at that particular subject only, without disturbing the others.

An embodiment of the method includes identifying the subjects.

In this context, "identifying" can simply amount to discerning each of a number of subjects, i.e. detecting that there are, for example, five distinct subjects in an environment of the image on display. It can alternatively go further, involving relating them to unique identifiers, generally pre-determined unique identifiers, e.g. "Bob", "Mary", etc. An effect is to facilitate the provision of differentiated feedback, essentially to allow feedback to be targeted at a particular one of the subjects whose visual focus of attention is estimated.

In a variant of this embodiment, identifying a subject includes relating the subject to a pre-determined identifier, and at least one signal to the system for providing an immersive effect is provided in dependence also on settings associated with the identifier.

An effect is to allow the immersive effects to be more finely tuned to different subjects, even where only a limited amount of effects data is associated with objects in the image or can be associated with objects in the image on the basis of their properties or on the basis of effects data received with the image data. The identification need not be unique to achieve a meaningful effect. For example, the identification can be of a category of subjects, with the immersive effect being provided on the basis also of settings associated with that category of subject. Thus, different effects can be provided to children and to adults, to women and to men and to humans and to animals. Also, effects can be provided selectively, i.e. only to adults but not to children. If the identification is of a particular individual, then the method can implement a type of learning, so that the immersive effects are provided on the basis of preferences associated with that individual subject.

In an embodiment, the visual focus of attention is tracked over time, and at least one signal to the system for providing an immersive effect is provided by subjecting a signal based on the position of the visual focus of attention relative to the location of the at least one object in the at least one image to a smoothing function.

This embodiment avoids problems that might occur when a subject scans an image including multiple objects that give rise to very different types of feedback. First, in this scenario, the system for providing immersive effects must have rapid response times in order to provide the correct effect without delay. Second, even where these rapid response times are given, the subject might be quite irritated if subjected to rapidly and extremely varying immersive effects. The smoothing function thus avoids this irritation of the subject, as well as enabling the use of a system for providing immersive effects which has slightly longer response times.

In an embodiment, the received data is representative of a sequence of moving images, and the data is received in association with data identifying at least one object in the images.

An effect is to enable a real-time implementation of the method in a system that is not necessarily capable of carrying out object identification algorithms on moving image data received in real-time. However, because the system still analyses the image data to locate the objects, it need not be provided with a stream of data mapping image locations to effects for each of the sequence of images.

In a variant of this method, the data identifying an object is associated with data identifying a position of the object in a first of a number of images.

In other words, the system is provided with position data detailing the initial position of the object, and can then track the object independently through the subsequent images. This still represents a saving in the amount of data associated with an object that has to be communicated to the system implementing the method (e.g. a digital television set or set-top box). The position data can be provided by a source separate from the source of the image data and/or the data identifying the objects.

An embodiment of the method includes determining at least one property of the at least one object, wherein providing the at least one signal to a system for providing an immersive effect to the at least one subject in dependence on at least a position of the visual focus of attention relative to the location of the at least one object in the at least one image includes adapting the signal on the basis of effects data associated with object properties.

An effect is that an appropriate effect can be provided when a subject's attention is focused on the particular object, but that it is not necessary to associated specific effects data with specific objects. Since such specific effects data need not be provided, there is less need for standardization between sources of image data and providers of systems implementing the method. For example, an object can have the property "dynamic" associated with it. The system implementing the method would then map that property to a set of control signals appropriate to this property and adapted to the available system for providing an immersive effect.

A variant of this method includes receiving data identifying at least one object in the at least one image in association with the data representative of the at least one image, and determining properties of the at least one object using the data identifying the at least one object.

This variant solves the problem of determining the properties relatively quickly. They may be included with the data identifying the at least one object, or a thesaurus or other kind of mapping can be used to determine the properties on the basis of the data identifying the at least one object.

According to another aspect, the system for controlling provision of immersive effects according to the invention includes:

an interface for receiving data representative of at least one image;

a data processing system for analyzing the image data to locate at least one object identified within the image;

a system for estimating a visual focus of attention of at least one subject able to observe the at least one image; and an interface for providing at least one signal to a system for providing an immersive effect to the at least one subject, wherein the system for controlling provision of immersive effects is configured to provide the signal in dependence on at least a position of the visual focus of attention relative to the location of the at least one object in the at least one image.

The system can be comprised in a system for rendering the at least one image, or it can co-operate with a system for capturing the at least one image in digital form.

In an embodiment, the system is configured to execute a method according to the invention.

According to another aspect of the invention, there is provided a computer program including a set of instructions capable, when incorporated in a machine-readable medium, of causing a system having information processing capabilities to perform a method according to the invention.

BRIEF DESCRIPTION OF THE DRAWINGS

The invention will be explained in further detail with reference to the accompanying drawings, in which.

DETAILED DESCRIPTION

Figure 1:
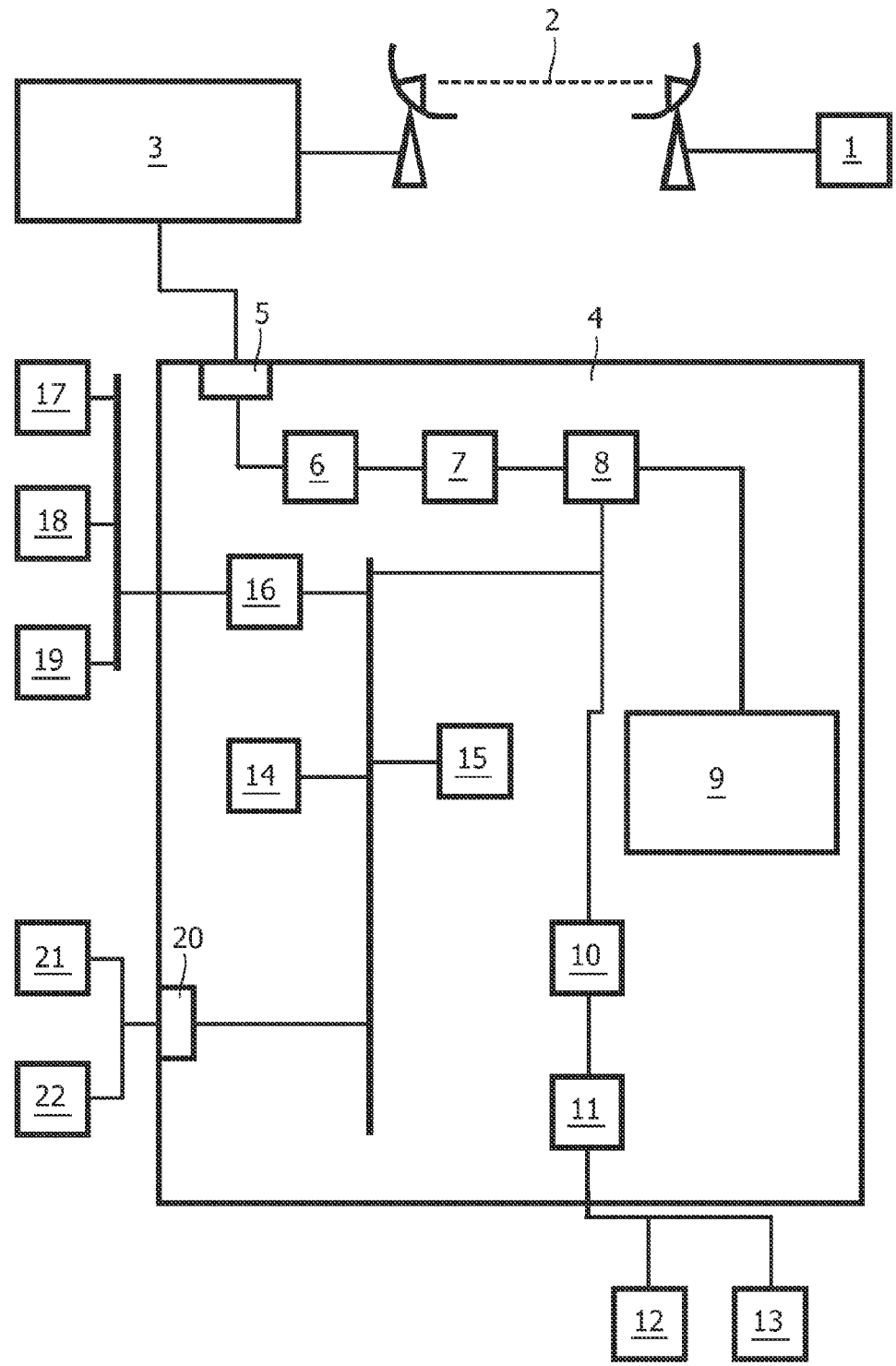
FIG. 1 is very schematic diagram of a first system for providing immersive effects in association with a sequence of moving images.

Referring to FIG. 1, a video signal comprising a sequence of images, possibly in the form of successive half-images or frames, is first broadcast by a broadcast station 1 over a satellite link 2 to a cable head end 3. From there, the video signal is provided to a digital television set 4 or similar broadcast receiver.

The digital television set 4 comprises a cable network interface 5, tuner 6, demodulator 7 and demultiplexer 8 for retrieving the video signal at least one synchronized accompanying audio stream and a synchronized accompanying data stream. These streams belong to a single event, and are thus linked together by means of tables in the broadcast multiplex in a manner known per se, e.g. from DVB (Digital Video Broadcasting) standards.

The video signal is provided to a display 9 and the audio signal is provided to an Audio Codec 10, amplifier 11 and one or more loudspeakers 12,13.

A data processing unit 14 and memory 15 are provided to execute control routines for controlling the operation of the digital television set 4 and for executing one or more routines that enable the digital television set 4 to control a system for providing immersive feedback to viewers watching the images on the display 9. To this end, the digital television set 4 includes an interface 16 to a number of devices 17-19 for providing an immersive effect.

The devices 17-19 in the illustrated embodiment include devices for providing haptic feedback, i.e. for conveying at least one of force, motion and vibration to a subject in close proximity to, generally in contact with, the device. In particular, the devices 17-19 can comprise a device worn on the person of a subject to which the immersive effect is to be provided, e.g. in the form of a glove. Alternatively, the devices 17-19 can be integrated in furniture or furnishings such as a sofa, cushion, rug, etc.

Although a haptic effect is a type of immersive effect that can be provided in a targeted way, any other type of immersive effect can additionally or alternatively be provided by the devices 17-19, or indeed by the loudspeakers 12,13. In the present context, immersive effects are considered to comprise any type of perceptible effect that enhances the experience of perceiving an object in an image. Such an effect adapts the user's perceived environment such that it is more congruent with what is visually perceived. Thus, the effect may stimulate any of a number of different senses, including touch, smell, hearing, vision etc. For example, the background lighting of the environment may be adapted or a particular soundscape may be provided.

In order to take account of the fact that each of a number of viewers may be paying attention to a different part of the image on the display 9, or indeed not paying attention to the image on display at all, the illustrated system is able to target immersive effects at particular users in dependence on where they are looking. To this end, it is provided with an interface 20 to at least one camera, here two cameras 21,22, enabling the system both to distinguish between viewers and to track they visual focus of attention. One suitable technique for doing this is described in Smith, K. et al., "Tracking the visual focus of attention for a varying number of wandering people", *IEEE Trans. on Pattern Analysis and Machine Intelligence*, 30 (7), July 2008. A method such as the one described therein comprises two components, namely a multiperson tracking method and a head-pose tracking method. The multiperson tracking process is a process of locating a variable number of moving subjects in a video over time. The head-pose tracking process locates the subjects' heads and estimates their orientation in space. In principle, the estimation of the visual focus of attention can alternatively be carried out by providing the users of the digital television set 4 with head-sets that include sensors for determining the gaze point of the wearers thereof. Alternatively, infrared tracking methods exist that determine the orientation of a person's eyes directly (eye-gaze tracking methods). However, the method using the cameras 21,22, which does not require a priori knowledge of the number and location of viewers, is unobtrusive and able to provide an estimate on the basis of a measurement over a larger distance (>3 m), is especially suitable for implementing the method of providing immersive effects described herein.

Figure 2:
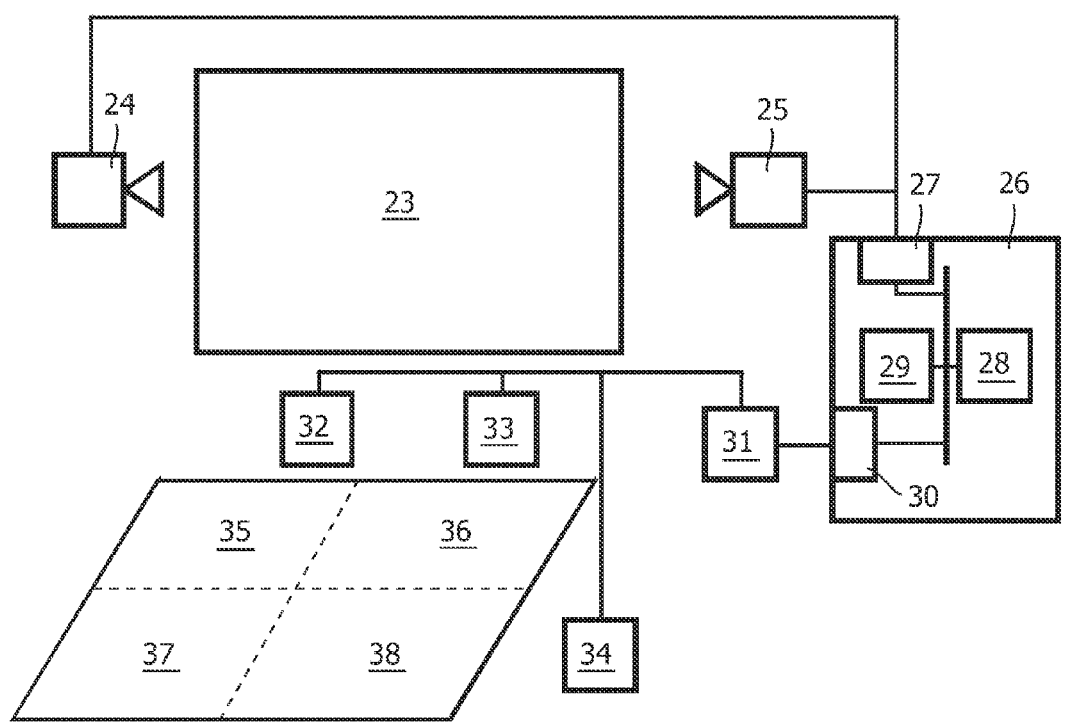
FIG. 2 is a very schematic diagram of a second system for providing immersive effects, in this case in association with a stationary image or sequence of slowly alternating images.

In FIG. 2, a second environment for implementing a method of providing an immersive effect is illustrated by way of example. In this setting, passers-by are able to observe an image or cycling sequence of images on an advertisement board 23. Both the image and the potential observers are captured by cameras 21,22, which provide digital image data to a computer device 26 fitted with a video card 27, data processing unit 28 and memory 29. The computer device 26 also comprises an interface 30 to a system for providing immersive effects. In the illustrated embodiment, the system for providing immersive effects comprises a control device 31 and three devices 32-34 for providing an immersive effect. The immersive effect can be targeted to any one of four sectors 35-38 in an environment of the advertisement board 23 in which the image on the advertisement board 23 is visible. For example, the devices 32-34 may be loudspeakers in a phased array, or they may be dispensers of scents targeted at one or more of the sectors 35-38.

The images from the cameras 24,25 enable the computer device 26 to execute a method of image analysis for identifying and locating viewers and tracking their visual foci of attention. Again, the technique described in Smith, K. et al., "Tracking the visual focus of attention for a varying number of wandering people", *IEEE Trans. on Pattern Analysis and Machine Intelligence*, 30 (7), July 2008, may be used.

Figure 3:
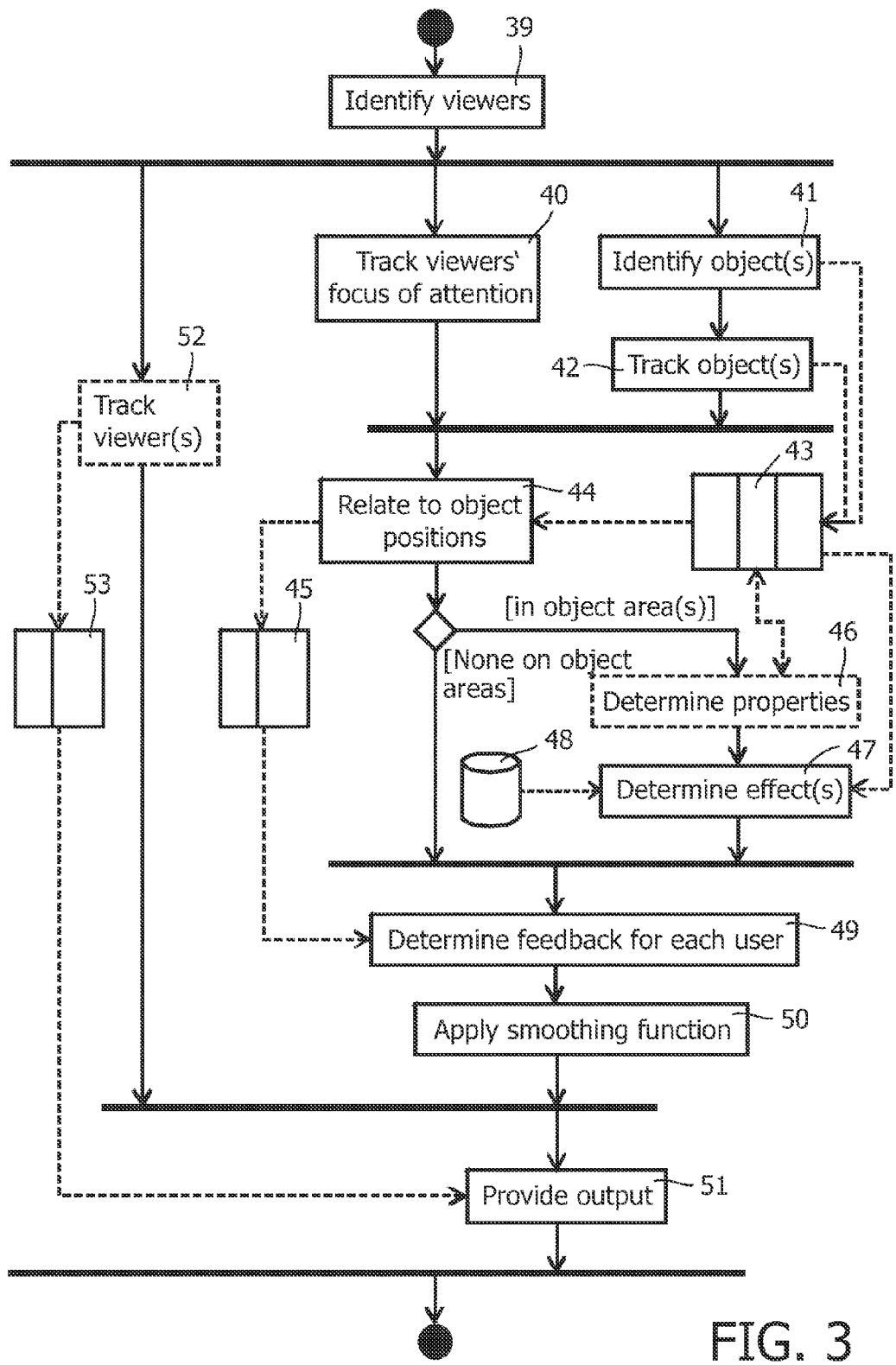
FIG. 3 is a flow chart illustrating a method of providing immersive effects.

FIG. 3 illustrates some steps for execution by the digital television set 4 of FIG. 1 or the computer device 26 of FIG. 2, in order to provide an immersive effect to a subject able to observe the images on the display 9 or the advertisements on the advertisement board 23 in dependence on whether they are observing particular objects within the images.

A first step 39 is generally more suited to execution by the digital television set 4, and is in principle optional. This step 39 involves identifying the subjects able to observe the images on the display 9, in particular relating them to a pre-determined identifier. To this end, the digital television set 4 maintains a database of identifiers of known users in memory 15. Such a database can comprise user profiles for recording the users' preferences with regard to the available immersive effects.

In one variant, the users use a user interface to notify the digital television set 4 of their presence. In another embodiment, they are provided with a portable device with a transponder, and the digital television set 4 automatically recognizes their presence. The technology required to implement such an embodiment is known from the field of audience measurement. In another variant, users register themselves by placing themselves in front of one of the cameras 21,22, whereupon they are identified using face recognition technology.

In an embodiment in which the devices 17-19 is worn by the user, e.g. in the form of a glove, this step 39 can also comprise associating at least one of the devices 17-19 with the user who is identified.

In the embodiment of FIG. 2, the first step 39 may involve no more than determining how many subjects are present in the sectors 35-38 and assigning them a temporary identifier for tracking purposes. However, certain characteristics of the viewers may be determined as well, such as whether a particular subject is a child or an adult.

In another embodiment, the first step 39 is replaced by a step of determining for each of the devices 17-19 whether a subject is associated with it, or for each of the sectors 35-38 whether a person is present in it, so that their visual focus of attention can then be tracked.

The tracking of viewers' visual foci of attention is done in a step 40 that is executed continually.

Simultaneously, objects within the images on display are identified (step 41) and their positions within the images are tracked (step 42). In the illustrated embodiment, use is made of a table 43 that contains the position and properties of each object.

In one embodiment, the digital television set 4 obtains data identifying the objects and, optionally, their initial positions and at least one property from the data stream that is provided in association with the video data from the cable head end 3. In an implementation of this embodiment, the cable head end 3 comprises a video data processing device (not shown) for analyzing the image data received from the broadcast station 1 and creating the data identifying and describing the objects in the moving images making up the video. To this end, it can execute image segmentation and similar digital image processing methods to identify and locate objects within the images. The data added to the multiplex making up the event includes at least the identification of the objects, and may include some properties, e.g. color, whether the object is dynamic or static, or even what the object represents. The data can also include position data, indicating the location of the object within the image. In one embodiment, the position of the object in each of the sequence of moving images can be encoded in the data provided to the system for providing immersive effects by the remote image analysis system that is comprised in the cable head end 3. This would keep the amount of data transmitted over the satellite link 2 to a relatively low level but increase the amount of data transmitted to the digital television set 4. If it is necessary or desirable to keep this volume of data low as well, then only the initial position of the object, i.e. its position in the first of a sequence of images in which it features, is represented in the data stream accompanying the video data. The digital television set 4 then tracks the object in the subsequent images by analyzing the data representative of these images.

Alternatively, the digital television set 4 can analyze the video data encoding the images to locate the objects without recourse to any position data. Indeed, it may carry out the step 41 of identifying objects on the basis of only video data. This is also the case for the embodiment of FIG. 2, in which the computer device 26 carries out the steps 41,42 described above on the basis of captured image data only. The step 41 of identifying objects can involve an analysis of the image and properties of the objects identified initially, in order to select one or more objects of which the properties are dominant in the image. Thus, the number of objects to be tracked is reduced. Moreover, the resolution with which objects are identified can be adapted to the accuracy with which the viewers' visual foci of attention can be estimated.

Using the table 43 and knowledge of the subjects' visual foci of attention, it is possible to relate these visual foci of attention to the object positions in the current image on display (step 44). In the illustrated embodiment, a table 45 is used to keep track of which objects which users are looking at.

To provide immersive feedback, the outputs of the devices 17-19,32-34 should be consistent with the kind of object the associated subject is focusing on. Thus, in the illustrated embodiment, an (optional) step 46 is carried out, in which the digital television set 4 or computer device 26 determines properties of objects identified and tracked. In the case of the digital television set 4 the properties can be represented in the data stream provided in association with the sequence of moving images, so that such information need merely be retrieved from it.

In another embodiment, the actual effects are represented in the received data stream, so that the step 46 of determining properties can be omitted. However, this requires a standardized way of encoding properties, that is also generally abstracted from the available physical devices 17-19. Thus, generally, the properties, or data that can be mapped to properties, should be provided. Alternatively, the digital television set 4 or computer device 26 can carry out image analysis to determine properties, such as motion status, temperature, smell or sound, using only the image data.

In the illustrated embodiment, the properties are translated to effects 47 using a database 48 of rules. This database 48 allows one to abstract object properties from feedback effects, and is specific to the configuration of devices 17-19,32-34 available.

Next (step 49), using the table 45 tracking the positions of each identified viewer's visual focus of attention, the appropriate feedback for each viewer is determined.

Thus, if the digital television set 4 or computer device 26 detects that a subject is looking at a very dynamic object (flying butterfly, explosion of a bomb, car crash, etc.), the system will allocate a strong haptic feedback (in the configuration of FIG. 1) or strong vibratory feedback (using the loudspeakers 12,13 in the configuration of FIG. 1 and the devices 32-34 in the configuration of FIG. 2) to that particular subject, for example. If the subject is looking at a background detail, or not looking at the display 9 or advertisement board 23 at all, then no feedback need be provided.

In the embodiments in which the first step 39 identifies viewers such that they are related to pre-determined identifiers, the feedback can be adjusted to suit settings associated with the identifiers. Thus, personal preferences represented in a user profile can be taken account of. Alternatively, where the pre-determined identifier is of a class of subjects (child, adult, male, female, human, animal), settings appropriate to the class to which the subject is determined to belong can be applied.

It is noted that the steps illustrated in FIG. 3 are executed continually, so that a continuous or quasi-continuous feedback signal for each subject is provided. Because subjects may only glance at an object or scan an entire image relatively quickly, a smoothing function is applied 50 to the feedback signal.

Finally, appropriate output signals are provided to the devices 17-19,32-34 for providing immersive effects to the subjects whose visual focus of attention is being tracked. In particular where subjects are not associated with one particular device 17-19,32-34 it is necessary to track (step 52) the subjects' positions, in order to provide the correct control signal to the correct device 17-19,32-34. In the illustrated embodiment, a table 53 is used to keep track of the subjects' positions. It is noted that this step 52 will generally be combined with the step 40 of tracking the subjects' visual foci of attention.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The method illustrated in FIG. 3 can be implemented in a cinema to provide force feedback through each seat. Tracking the visual focus of attention of the occupant of the seat can be done using infrared cameras or using spectacles, especially where the film includes 3D effects and the users are provided with spectacles to observe these effects.

It is observed that the step 49 of providing feedback to each user can be replaced by a step in which each user receives the same feedback, but the feedback depends on the distribution of the foci of attention of multiple subjects within the image.

Thus, the strength of the feedback may depend on the proportion of subjects actually observing the object of which the properties determine the feedback (e.g. the dominant object in the image).

Although the principles of the invention have been explained using an embodiment in which the image data is broadcast and an embodiment in which it is captured using cameras, the image data may alternatively be provided on a data carrier, such as an optical disk. This disk may also include the metadata describing the objects present in the image data.

The invention claimed is:

1. A method of providing immersive effects, the method comprising:
    in a system for controlling provision of immersive effects to one or more subjects able to view a video stream comprised of a sequence of video frames:
    receiving, by a digital broadcast receiver, a video stream representative of a sequence of video frames including at least one image;
    receiving, by the digital broadcast receiver, in a separate data stream, accompanying object descriptors corresponding to at least one object in the sequence of video frames of the received video stream;
    identifying, by a processor of the digital broadcast receiver, the presence of one or more subjects able to observe a display of the video stream,
    determining the number of identified subjects;
    assigning a temporary identifier to each identified subject;
    analyzing, by a data processing unit of the digital broadcast receiver, the image data in the received video stream to locate at least one object identified within the at least one image without recourse to position data;
    determining, by the data processing unit, at least one property of the at least one identified object within the at least one image based on the accompanying object descriptors,
    wherein the at least one determined property of the at least one object is independent of the location of the at least one object within the at least one image, and
    wherein the at least one property of the at least one identified object represents at least one of: a quality, a characteristic attribute, and a distinctive feature of the at least one identified object within the at least one image;
    estimating, by the data processing unit, a respective visual focus of attention of each of the one or more identified subjects able to observe the at least one image; and
    providing, by the data processing unit, to an external system for providing immersive effects, at least one signal in dependence on at least a position of the visual focus of attention of each of the one or more identified subjects able to observe the at least one image relative to the location of the at least one object in the at least one image;
    mapping, by the data processing unit, the at least one determined property of the at least one identified object to a set of control signals appropriate to the at least one determined property of the at least one identified object; and
    adapting, by the data processing unit, the at least one signal provided to the external system for providing immersive effects, on the basis of effects data associated with the set of control signals appropriate to the at least one determined property of the at least one object.

2. The method according to claim 1, wherein the estimating further comprises adapting the at least one signal provided to the external system for providing immersive effects in dependence on the foci of attention of the one or more identified subjects.

3. The method according to claim 2,
    wherein the external system for providing immersive effects is configured to provide separate immersive effects at each of a number of output locations, and
    wherein the system is further configured to determine the location of the one or more identified subjects, at least in relation to the number of output locations.

4. The method according to claim 1, wherein the external system for providing immersive effects includes at least one device for providing haptic feedback.

5. The method according to claim 1, wherein the identifying further includes relating the identified subjects to a predetermined identifier, and wherein at least one signal is provided to the external system for providing immersive effects is provided in dependence in part on settings associated with the predetermined identifier.

6. The method according to claim 1, wherein the visual focus of attention of each identified subject is tracked over time in accordance with the assigned temporary identifier, and at least one signal is provided to the external system for providing immersive effects by applying a smoothing function to a signal based on the position of the visual focus of attention of the identified subject relative to the location of the at least one object in the at least one image.

7. The method according to claim 1, wherein the received data is representative of a sequence of moving images, and the data is received in association with data identifying at least one object in the images.

8. The method according to claim 7, wherein the data identifying an object is associated with data identifying a position of the object in a first image from among a number of images.

9. The method according to claim 1, including:
    determining at least one property of the at least one object,
    wherein the providing further includes adapting the signal on the basis of effects data associated with object properties.

10. The method according to claim 9, including: receiving data identifying at least one object in the at least one image in association with the data representative of the at least one image, and determining properties of the at least one object using the data identifying the at least one object.

11. The method according to claim 1, wherein the identifying by the digital broadcast receiver, of those subjects present to view a video stream from among the plurality of subjects, further includes those subjects notifying the digital broadcast receiver of their presence.

12. The method according to claim 1, wherein the identifying by the digital broadcast receiver, of those subjects present to view a video stream from among the plurality of subjects, further includes the digital broadcast receiver automatically recognizing the presence of those subjects present to view the video stream.

13. A system for controlling provision of immersive effects to subjects able to view a video stream comprised of a sequence of video frames, the system including:
    a first interface for receiving a video stream at a digital broadcast receiver, the video stream being representative of a sequence of video frames including at least one image and a corresponding set of object descriptors corresponding to at least one object in the sequence of video frames of the video stream;

a data processor for analyzing the at least one image of the received video stream to locate at least one object identified within the image without recourse to position data;

an analysis system configured to estimate a respective visual focus of attention of one or more subjects able to observe the at least one image, and configured to determine at least one property of the at least one object based on the accompanying object descriptors, wherein the at least one property of the at least one object is independent of the location of the at least one object within the image and represents at least one of: a quality, a characteristic attribute, and a distinctive feature of the at least one object, and wherein the analysis system is further configured to map the at least one property to a set of control signals appropriate to the at least one property, and wherein the analysis system is further configured to adapt the at least one signal on the basis of effects data associated with the set of control signals appropriate to the at least one property of the at least one object;

a second interface for providing at least one signal to an external system for providing an immersive effect to the one or more subjects, wherein the external system for controlling provision of immersive effects is configured to provide the signal in dependence on at least a position of the visual focus of attention of the one or more subjects relative to the location of the at least one object in the at least one image.

14. The system according to claim 13, wherein the estimating a respective visual focus of attention comprises adapting the at least one signal provided to the external system for providing immersive effects depending on the foci of attention of the one or more identified subjects.

15. The system according to claim 14,
wherein the external system for providing immersive effects is configured to provide separate immersive effects at each of a number of output locations, and
wherein the external system for providing immersive effects is configured to determine the location of the one or more identified subjects, at least in relation to the number of output locations.

16. The system according to claim 13, wherein the external system for providing immersive effects includes at least one device for providing haptic feedback.

17. The system according to claim 13, wherein identifying one or more subjects includes relating the identified subjects to a pre-determined identifier, and wherein at least one signal is provided to the external system for providing immersive effects is provided in dependence in part on settings associated with the predetermined identifier.

18. The system according to claim 13, wherein the visual focus of attention of each identified subject is tracked over time in accordance with the assigned temporary identifier, and at least one signal is provided to the external system for providing immersive effects by applying a smoothing function to a signal based on the position of the visual focus of attention of the identified subject relative to the location of the at least one object in the at least one image.

19. The system according to claim 13, wherein the received video stream is representative of a sequence of moving images, and the data is received in association with data identifying at least one object in the images.

20. The system according to claim 19, wherein the data identifying an object is associated with data identifying a position of the object in a first image from among a number of images.

21. The system according to claim 13, wherein providing at least one signal includes adapting the signal on the basis of effects data associated with object properties.

22. The system according to claim 21, wherein receiving a video stream includes receiving data identifying at least one object in the at least one image in association with the data representative of the at least one image, and determining properties of the at least one object using the data identifying the at least one object.

23. The system according to claim 13, wherein the identifying by the digital broadcast receiver, of those subjects present to view a video stream from among the plurality of subjects, includes those subjects notifying the digital broadcast receiver of their presence.

24. The system according to claim 13, wherein the identifying by the digital broadcast receiver, of those subjects present to view a video stream from among the plurality of subjects, includes the digital broadcast receiver automatically recognizing the presence of those subjects present to view the video stream.

25. A non-transitory computer-readable storage medium, comprising any computer readable storage medium that is not a transitory propagating signal or wave, having stored thereon instructions that when executed cause processing circuitry to:

receive, by a digital broadcast receiver, a video stream representative of a sequence of video frames including at least one image;

receive, by the digital broadcast receiver, accompanying object descriptors corresponding to at least one object in the sequence of video frames of the received video stream;

identify, by a processor of the digital broadcast receiver, the presence of one or more subjects able to observe a display of the video stream, determine the number of identified subjects;

assign a temporary identifier to each identified subject;

analyze, by a data processing unit of the digital broadcast receiver, the image data in the received video stream to locate at least one object identified within the at least one image without recourse to position data;

determine, by the data processing unit, at least one property of the at least one identified object within the image based on the accompanying object descriptors, wherein the at least one property of the at least one object is independent of the location of the at least one object within the at least one image and the at least one property represents at least one of: a quality, a characteristic attribute, and a distinctive feature of the at least one identified object;

estimate, by the data processing unit, a respective visual focus of attention of each of the one or more subjects able to observe the at least one image; and provide, by the data processing unit, at least one signal in dependence on at least a position of the visual focus of attention of each of the one or more subjects able to observe the at least one image relative to the location of the at least one object in the at least one image, to a system for providing immersive effects;

map, by the data processing unit, the at least one determined property of the at least one identified object to a set of control signals appropriate to the at least one determined property of the at least one identified object; and adapt, by the data processing unit, the at least one provided signal on the basis of effects data associated with the set of control signals appropriate to the at least one property of the at least one object.

* * * * *